US011162879B2

(12) United States Patent
Oberreit et al.

(10) Patent No.: US 11,162,879 B2
(45) Date of Patent: Nov. 2, 2021

(54) PARTICLE DETECTION SYSTEM AND METHOD

(71) Applicant: Kanomax FMT, Inc., White Bear Lake, MN (US)

(72) Inventors: Derek Oberreit, Roseville, MN (US); David Blackford, White Bear Lake, MN (US); Patricia B. Keady, Fort Collins, CO (US); Siqin He, St. Paul, MN (US)

(73) Assignee: Kanomax FMT, Inc., White Bear Lake, MN (US)

( * ) Notice: Subject to any disclaimer, the term of this patent is extended or adjusted under 35 U.S.C. 154(b) by 305 days.

(21) Appl. No.: 16/044,376

(22) Filed: Jul. 24, 2018

(65) Prior Publication Data
US 2019/0025165 A1 Jan. 24, 2019

Related U.S. Application Data

(60) Provisional application No. 62/536,005, filed on Jul. 24, 2017.

(51) Int. Cl.
*G01N 1/40* (2006.01)
*G01N 15/06* (2006.01)
(Continued)

(52) U.S. Cl.
CPC ............ *G01N 1/4022* (2013.01); *G01N 1/42* (2013.01); *G01N 15/0255* (2013.01);
(Continued)

(58) Field of Classification Search
CPC .... G01N 1/4022; G01N 1/42; G01N 15/0612; G01N 15/065; G01N 15/0255;
(Continued)

(56) References Cited

U.S. PATENT DOCUMENTS

2008/0144003 A1\* 6/2008 Blackford ............ G01N 15/065
356/37
2014/0060155 A1\* 3/2014 Hering ................. G01N 1/2202
73/28.04
(Continued)

OTHER PUBLICATIONS

Kanomax Nanopaticle Nebulizer Model 9110 Brochure, Published Jun. 2016 (Year: 2016).\*

*Primary Examiner* — Herbert K Roberts
*Assistant Examiner* — John M Royston
(74) *Attorney, Agent, or Firm* — Skinner and Associates; Joel D. Skinner, Jr.

(57) ABSTRACT

A particle detector for rapidly detecting and identifying sub 20 nm particles in Ultra Pure Water (UPW) is disclosed. The detector has a nano particle extractor, a nanoparticle collector, and a tracer particle introducer. The extractor limits the size of droplets output to a predetermined size. The extractor includes (1) a liquid sample inlet, (2) a nebulizer connected to the liquid sample inlet (the nebulizer has a gas supply, and an outlet), (3) an impactor arranged to receive material output from the nebulizer, (4) an evaporator connected to the nebulizer and impactor for providing an aerosol at the extractor outlet, and (5) an aerosol connected to the evaporator. The collector us connected to the extractor and has: (1) a collector inlet connected to the aerosol outlet of the extractor, (2) a vapor condensation growth tube connected to the collector inlet, and (3) a repositionable particle capture plate arranged to receive material output from the growth tube at spatially varying positions. The tracer particle introducer is connected to the liquid sample inlet of the extractor. It includes a tracer particle supply connected to a pump which is connected to the extractor. A method for rapid identification of sub–20 nm particles in UPW is also disclosed.

20 Claims, 12 Drawing Sheets

Figure 1:
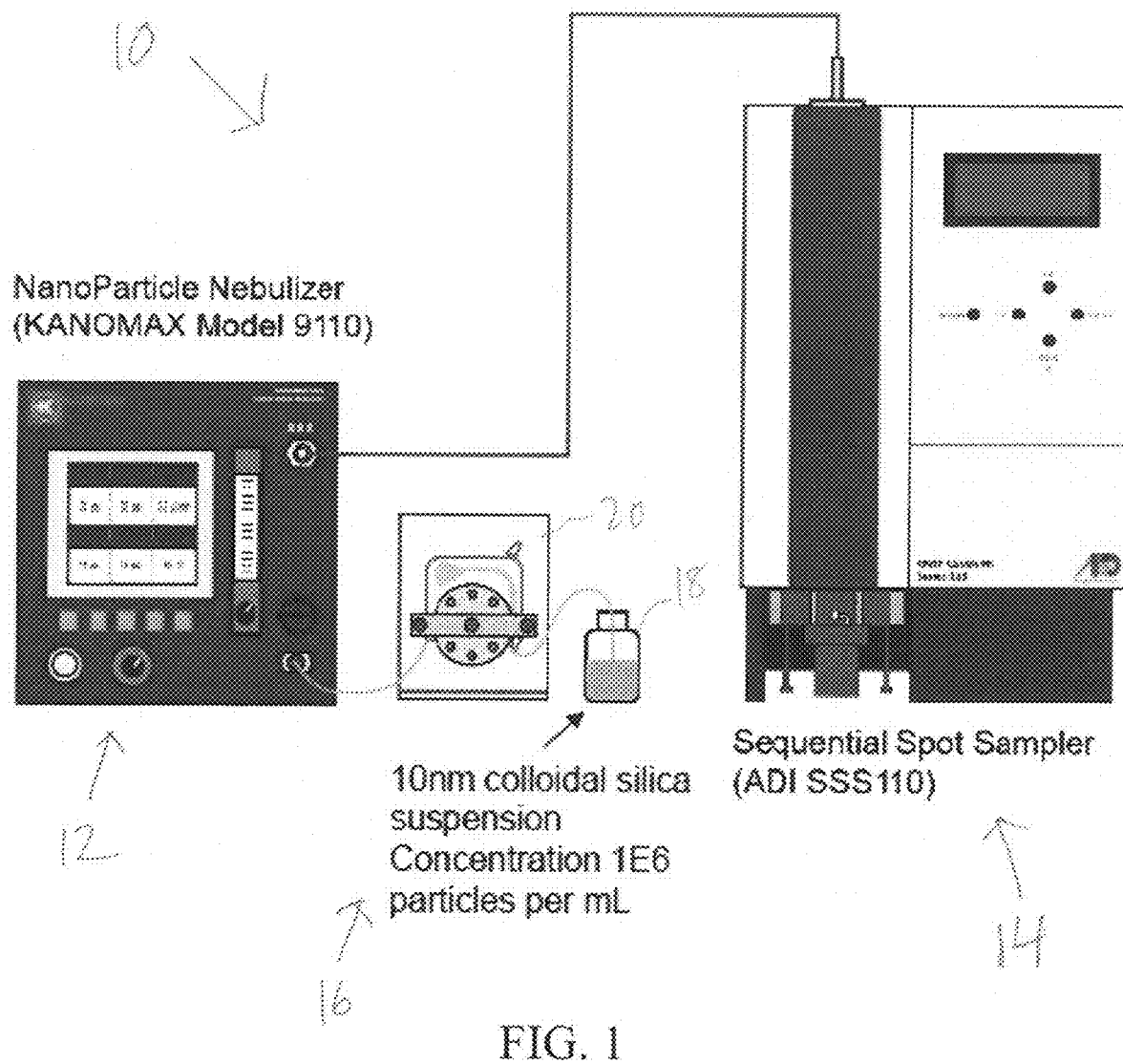

(51) Int. Cl.
*G01N 15/02* (2006.01)
*G01N 1/42* (2006.01)
*G01N 15/00* (2006.01)

(52) U.S. Cl.
CPC ....... *G01N 15/065* (2013.01); *G01N 15/0612* (2013.01); *G01N 2001/4027* (2013.01); *G01N 2015/0038* (2013.01); *G01N 2015/0053* (2013.01); *G01N 2015/0261* (2013.01); *G01N 2015/0283* (2013.01); *G01N 2015/0681* (2013.01)

(58) Field of Classification Search
CPC ... G01N 2015/0681; G01N 2015/0261; G01N 2015/0053; G01N 2015/0283; G01N 2001/4027; G01N 2015/0038
See application file for complete search history.

(56) References Cited

U.S. PATENT DOCUMENTS

2015/0308940 A1* 10/2015 Blackford .......... G01N 15/0255 73/61.71
2017/0138939 A1* 5/2017 Borch .............. G01N 33/54313

* cited by examiner

PARTICLE DETECTION SYSTEM AND METHOD

CROSS-REFERENCE TO RELATED APPLICATIONS, IF ANY

This application claims the benefit under 35 U.S.C. § 119(e) of U.S. Provisional Patent Application Ser. No. 62/253,005, filed Jul. 24, 2017, which is hereby incorporated by reference.

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to particle detection systems, apparatus and methods. Particularly, the invention relates to a nano particle detection system which is useable to rapidly identify sub–20 nanometer particles in Ultra Pure Water (UPW). The invention most particularly relates to a method and apparatus for rapidly identifying sub–20 nm particles in UPW which is useable in semiconductor manufacture.

2. Background Information

The detection of particles in Ultra Pure Water (UPW) is critical for successfully manufacturing semiconductors. As semiconductor line width continues to shrink, particle detection at less than 20 nanometers (nm) becomes essential. Particle composition is also important because it allows for the identification of particle sources. Recent attempts at sub–50 nm particle identification in UPW have been partially successful, however, such methods require long sample periods and are material dependent.

All US patents and patent applications, and all other published documents mentioned anywhere in this application are incorporated by reference in their entirety.

BRIEF SUMMARY OF THE INVENTION

The aspects, features, advantages, benefits and objects of the invention will become clear to those skilled in the art by reference to the following description, claims and drawings.

In one aspect, the invention provides a particle detector apparatus including, an extractor having a liquid sample inlet, and a nebulizer connected to the liquid sample inlet, the nebulizer having a gas supply, and an outlet; and a collector connected to the extractor, the collector having an collector inlet connected to the outlet of the extractor, a growth tube connected to the collector inlet, and at least one particle capture plate constructed and arranged to receive material output from the growth tube.

In another aspect, the invention provides a particle detector for rapidly detecting and identifying sub 20 nm particles in Ultra Pure Water, including, a. a nano particle extractor for limiting the size of droplets output to a predetermined size, the extractor having:
 i. a liquid sample inlet,
 ii. a nebulizer connected to the liquid sample inlet, the nebulizer having a gas supply, and an outlet,
 iii. an impactor constructed and arranged to receive material output from the nebulizer,
 iv. an evaporator communicatively connected to the nebulizer and impactor for providing an aerosol at the extractor outlet, and
 v. an aerosol outlet communicatively connected to the evaporator;

b. a nano particle collector connected to the extractor, the collector having;
 i. a collector inlet connected to the aerosol outlet of the extractor,
 ii. a vapor condensation growth tube connected to the collector inlet, and
 iii. a repositionable particle capture plate constructed and arranged to receive material output from the growth tube at spatially varying positions; and c. a tracer particle introducer connected to the liquid sample inlet of the extractor, the tracer particle introducer including a tracer particle supply connected to a pump which is connected to the extractor, and wherein the tracer particles are provided in a colloidal suspension of silica, of approximately 10 nm in size.

BRIEF DESCRIPTION OF THE SEVERAL VIEWS OF THE DRAWING

FIG. 1 shows an embodiment of the particle detection system of the invention, including a nano particle extractor and a nano particle collector, and further preferably including a tracer particle introducer.

FIG. 2 shows an embodiment of the nano particle extractor of the system, connected to the tracer particle introducer.

FIG. 3 is a diagram of the structure and function of a basic embodiment of the nano particle extractor assembly and interconnected tracer particle injector.

FIG. 4 is a diagram of an embodiment of the analytical nebulizer element of the nano particle extractor assembly.

FIG. 5 is a diagram of a more detailed embodiment of the nano particle extractor and tracer particle injector.

FIG. 6 is a front perspective view an embodiment of the nano particle collector of the system.

FIG. 7 is another front perspective view of the nano particle collector.

FIG. 8 is a back perspective view of the nano particle collector.

FIG. 9 is a side view of the particle collector.

FIG. 10 is a diagram of an embodiment of a growth tube of the nano particle collector.

FIG. 11 is a perspective view of an embodiment of a sample plate of the nano particle collector.

FIG. 12 is a top view of the sample plate.

DETAILED DESCRIPTION

FIG. 1 shows a preferred embodiment of the nano particle detector system 10 of the invention. The detector system 10 provides a means and method of collecting and identifying particles as small as 10 nm. The detector system 10 yields results quickly, and particularly within a 24-hour collection period. The preferred embodiment of detector system 10 includes a nano particle extractor 12 communicatively connected to a nano particle collector 14. The particle extractor is preferably an analytical nebulizer 12. The most preferred nebulizer is a Nano Particle Nebulizer (NPN), Model 9110 manufactured and supplied by Kanomax FMT (KFMT) of St. Paul, Minn., USA. The nano particle collector 14 is preferably a Series 110 Sequential Spot Sampler manufactured and supplied by Aerosol Devices, Inc. of Fort Collins, Colo., USA. The detector system 10 also preferably has a tracer particle introducer 16 connected to the extractor/nebulizer 12. The introducer or injector 16 permits introduction of tracer particles of known size, composition and concentration into the nebulizer 12. The introducer 16 includes a supply container 18 and a pump 20, preferably a peristaltic pump. In an exemplary use, the introduced tracer particles are from a colloidal suspension of known particles (for example silica) of known size (for example 10 nm) and known concentration of particles per milliliter. Tracer may be may be introduced directly or via online dilution into the liquid sample stream.

Figure 2:
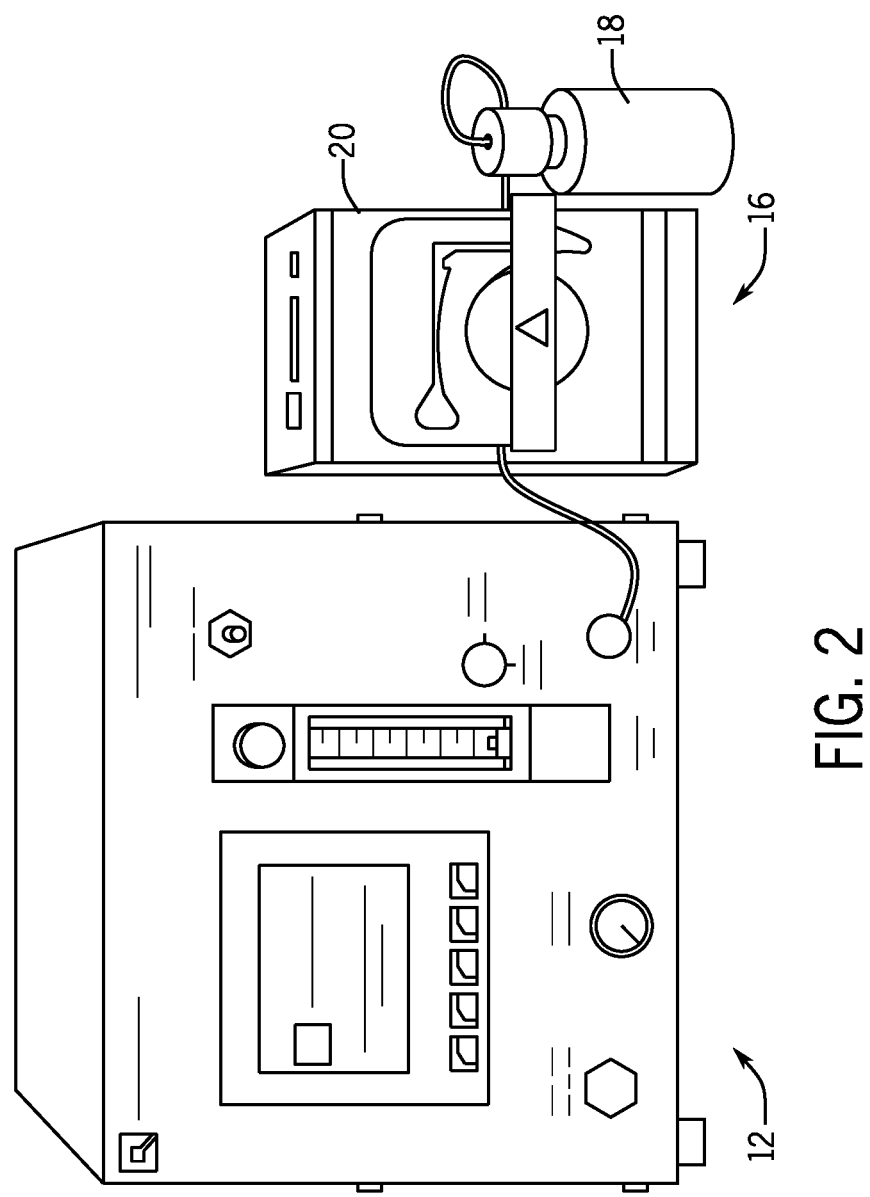

Referring also to FIG. 2, the Nano particle nebulizer 12 of the system 10 produces droplets of very small size which rapidly dry to produce particles consisting of precipitated and solid non-volatile material present in an UPW sample. The nebulizer 12 produces droplets with a very small peak diameter of <1 micrometer. This permits limiting the presence of droplets sufficiently large to introduce interference in detection.

Small droplets this size have been produced in the past using Electrospray. However, the liquid must be conducting. High-purity water is essentially non-conducting. Therefore, electrospray requires the use of additives to make UPW conducting. Additives are less than ideal. Electrospray can also be prone to blockages because the physical dimensions of the Electrospray nozzle are very small. The nebulizer 12 of the invention does not require a conducting liquid and has successfully nebulized particle suspensions as large as 500 nm. without blockage.

Figure 3:
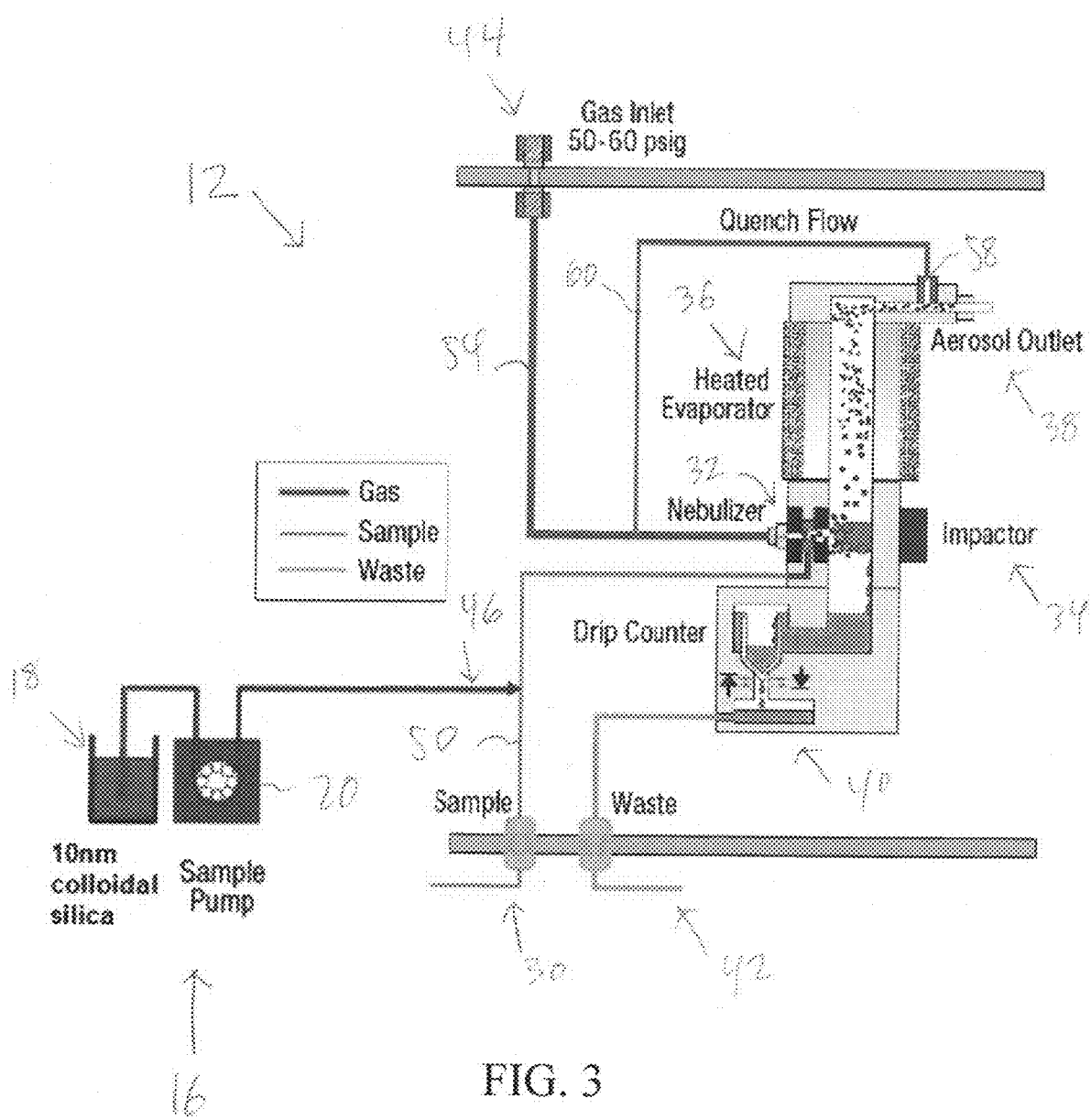
Figure 4:
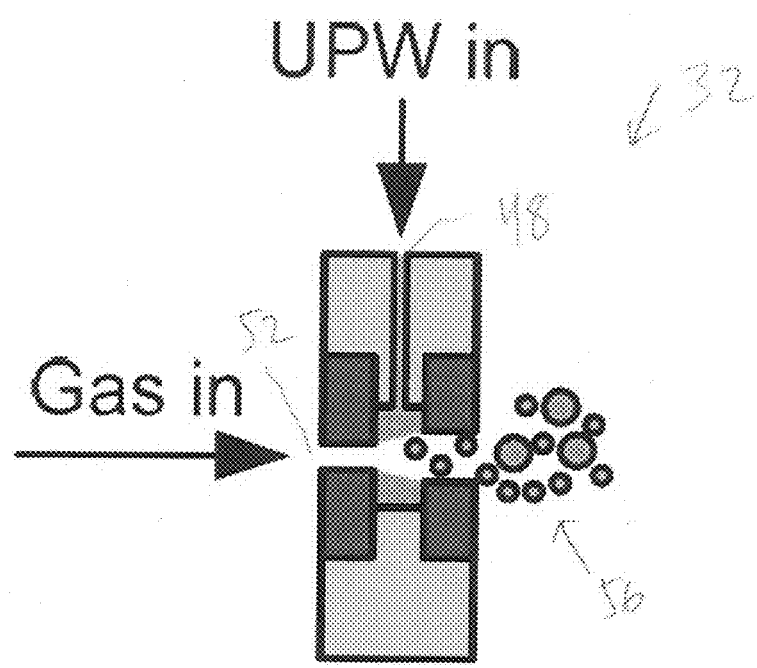
Figure 5:
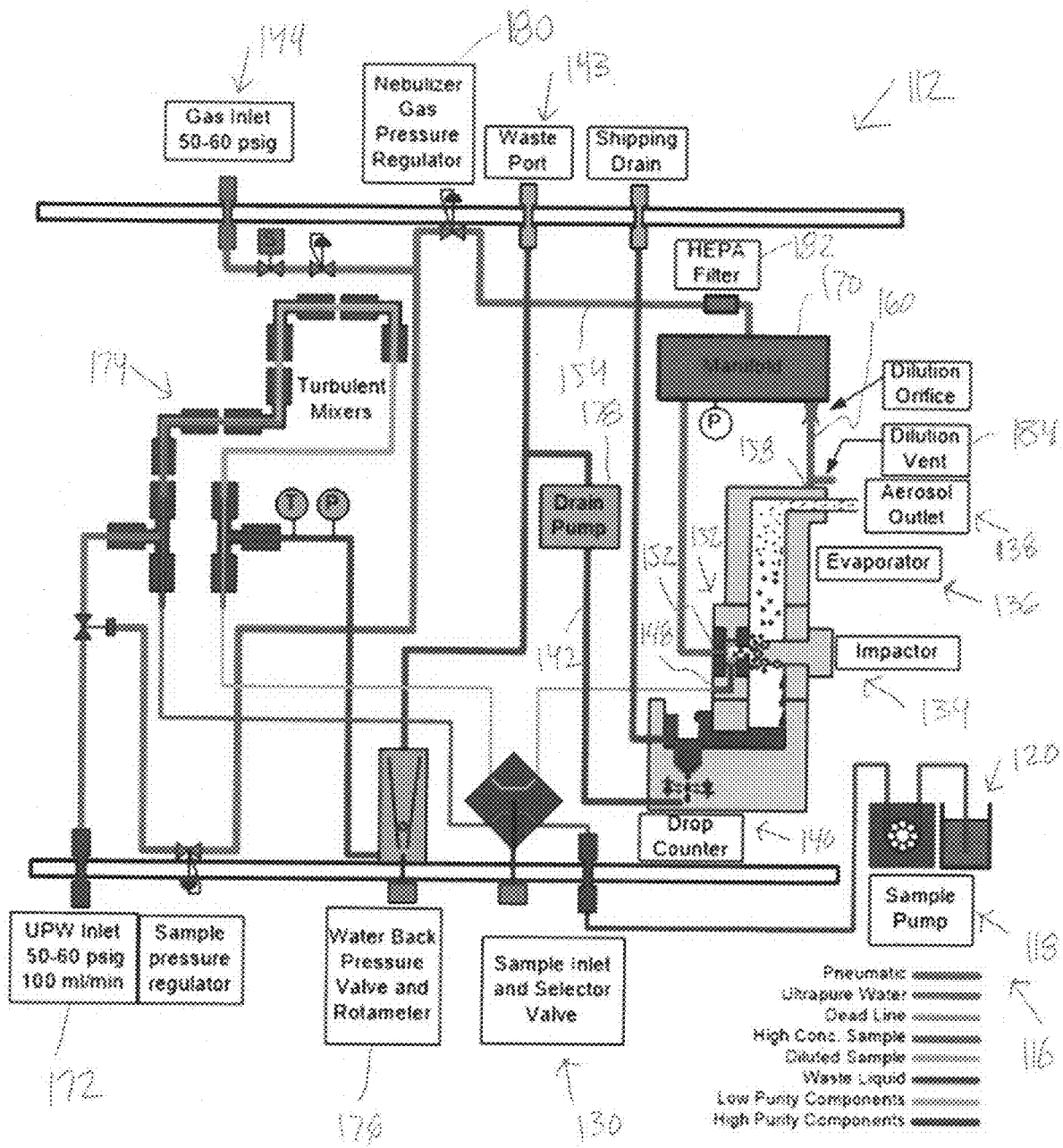
Figure 6:
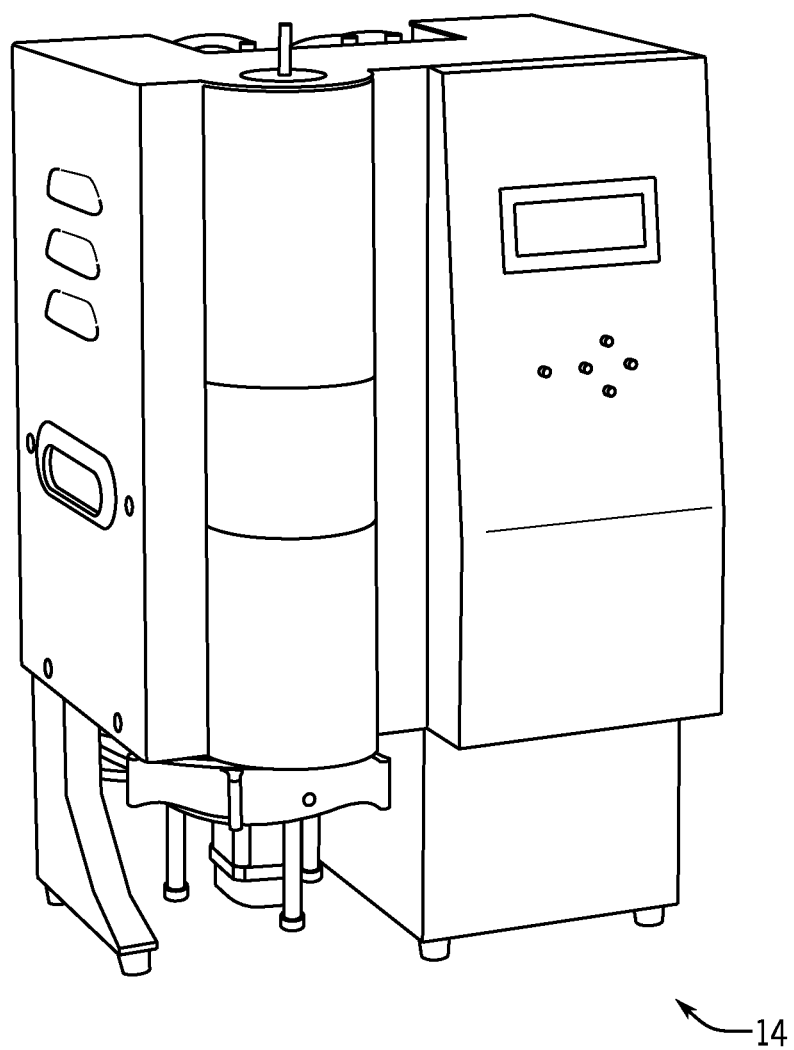
Figure 7:
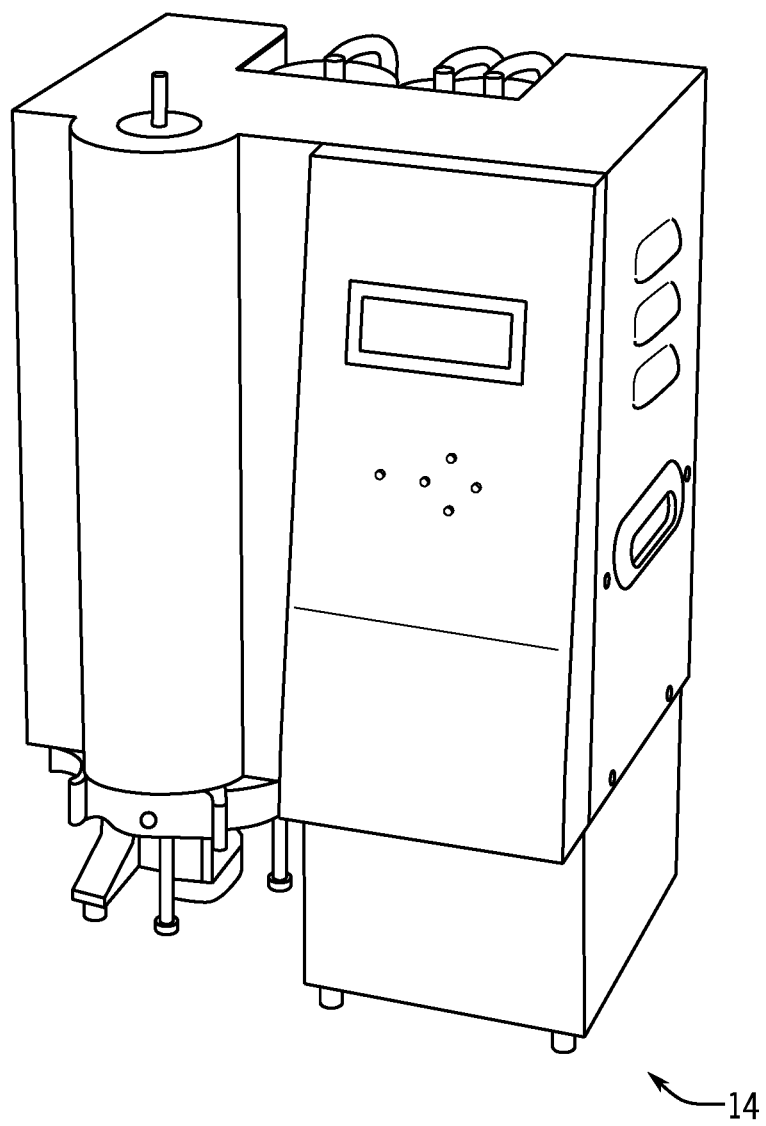
Figure 8:
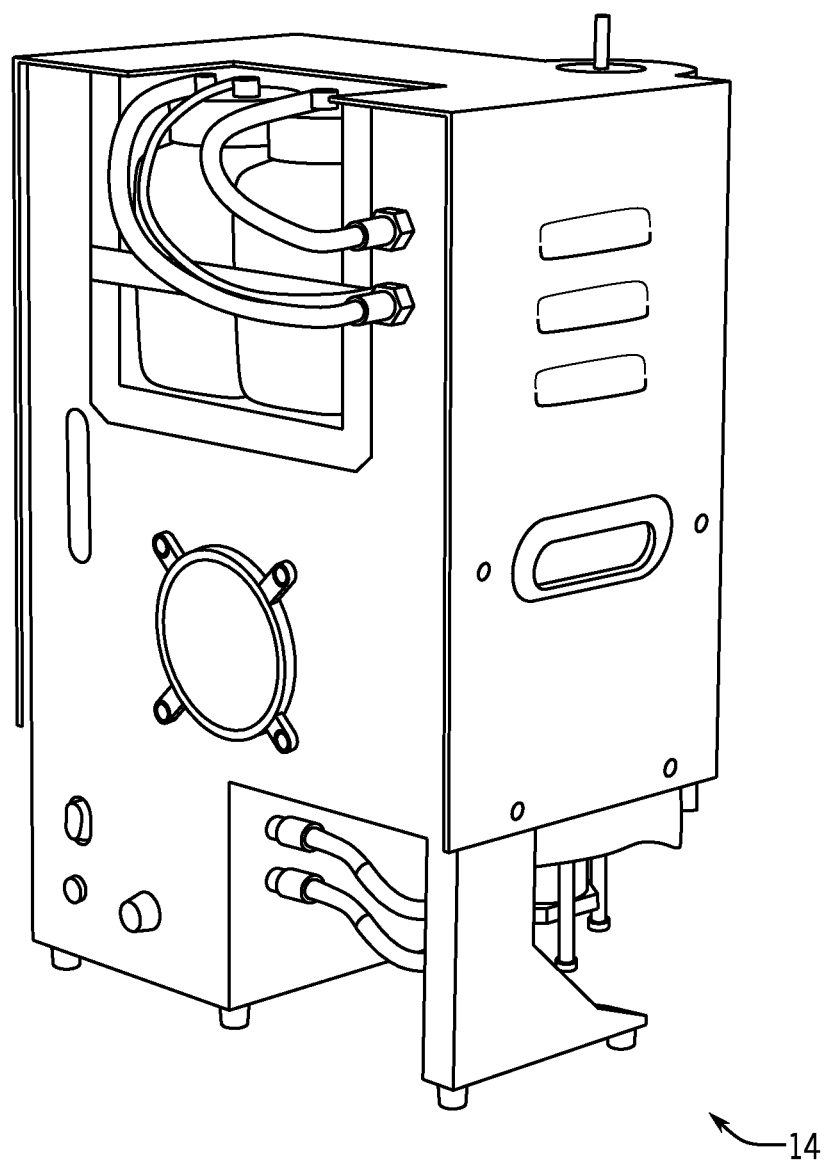
Figure 9:
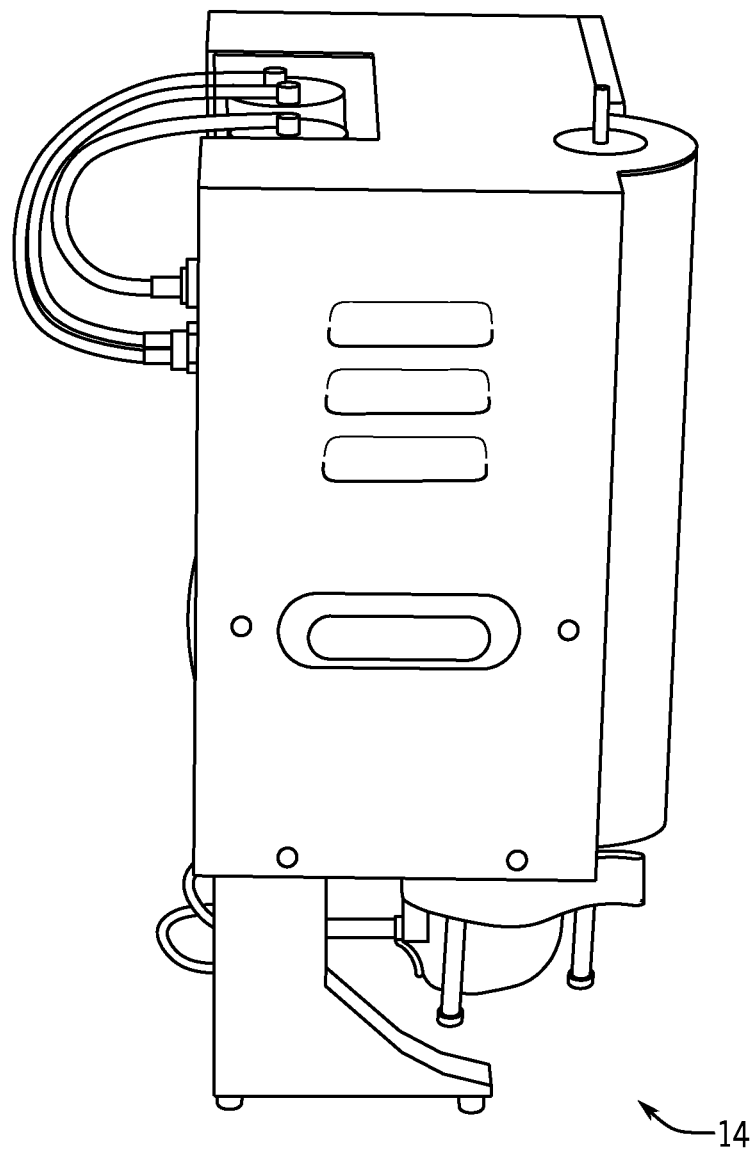
Figure 10:
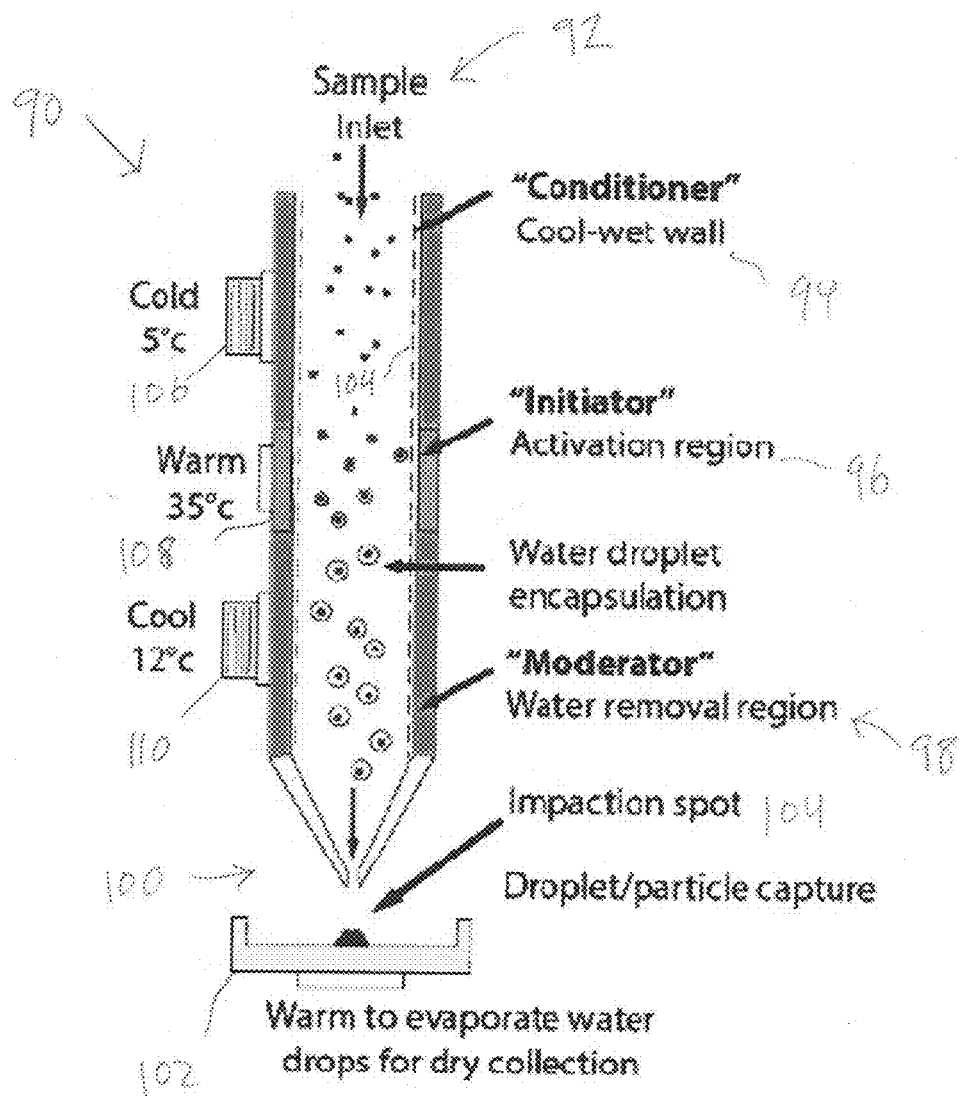

FIG. 3 is a diagram showing the structure and function of a basic embodiment of the extractor/nebulizer 12. The most preferred nebulizer is a Nano Particle Nebulizer (NPN), Model 9110 manufactured and supplied by Kanomax FMT (KFMT) of St. Paul, Minn., USA. The nebulizer 12 includes a sample inlet 30, a nebulizer element 32, an impactor 34, an evaporator 36 and an aerosol outlet 38. The sample inlet 30 is connected to the liquid input 48 of the nebulizer 32 via sample line 50. Gas is input at inlet 44 connected to gas input 52 of the nebulizer 32 via gas line 54. Nebulizer output 56 is directed at impactor 34, which in turn is interconnected to heated evaporator 36. Aerosol is output at outlet 38 which is communicatively connected to the nano particle collector 14. Quench flow is provided by input 58 disposed proximate the aerosol output 38 via secondary gas line 60 interconnected to gas line 54. Waste is collected via drip counter 40 which is connected to waste line 42. FIG. 4 illustrates an embodiment of the nebulizer assembly 32 with a predetermined geometry with liquid inlet 48, gas inlet 52 and output 56.

FIG. 5 is a diagram showing a preferred embodiment of the extractor/nebulizer 112. The most preferred nebulizer 112 is a Nano Particle Nebulizer (NPN), Model 9110 manufactured and supplied by Kanomax FMT (KFMT) of St. Paul, Minn., USA. Like the basic embodiment of the nebulizer 12 shown in FIG. 3, the nebulizer 112 includes a sample inlet 130, a nebulizer element 132, an impactor 134, an evaporator 136 and an aerosol outlet 138. The nebulizer assembly 132 has a predetermined geometry with liquid inlet 148, gas inlet 152 and output 156. The sample inlet 130 is connected to the liquid input 148 of the nebulizer 132 via sample line 150. Gas is input at inlet 144 connected to gas input 152 of the nebulizer 132 via gas line 154. Nebulizer output 156 is directed at impactor 134, which in turn is interconnected to heated evaporator 136. Aerosol is output at outlet 138 which is communicatively connected to the nano particle collector 114. Dilution gas may be provided by input 158 (vented at 184) disposed proximate the aerosol output 138 via secondary gas line 160 interconnected to gas line 154 via manifold 170. The manifold 170 is connected to the gas inlet 144 preferably through intervening regulator 180 and filter 182 Waste is collected via drip counter 140 which is connected to waste line 142 which leads to waste port 143. UPW is input at inlet 172 which is connected to turbulent mixer assembly 174. Waste line 142 is connected to water back pressure valve and rotameter 176. A drain pump 178 is preferably connected to line 142 between the drop counter 140 and waste port 143. The introducer or injector 116 permits introduction of tracer particles of known size, composition and concentration into the nebulizer 112. The introducer 116 includes a supply container 118 and a pump 120, preferably a peristaltic pump.

Referring to FIGS. 6-10, the nano particle collector 14 of the detector system 10 is preferably a Series 110 Sequential Spot Sampler manufactured and supplied by Aerosol Devices, Inc. of Fort Collins, Colo., USA. The nano particle collector 14 uses a condensation particle growth technique. This produces micrometer size water droplets seeded by discrete particles aerosolized by the Nano Particle Extractor/Nebulizer 12. The increase in particle size by condensational growth is necessary to exploit inertial separation to gently deposit the particles onto a substrate for analysis. Analysis is preferably done by Scanning Electron Microscopy with Energy Dispersive X-Ray Spectroscopy (SEM/EDX). An exemplary SEM/EDX system useable for analysis is the SU8200 Series FE-SEM available from Hitachi High Technologies America, Inc., Nanotechnology Systems Division.

Referring also to FIGS. 10, 11 and 12, the sequential spot sampler of the nano particle collector 14 includes a growth tube 90, a sequential spot collector module, and a sample plate 200. The growth tube 90 has a predetermined length and diameter, and includes a sample inlet 92, a conditioner region 94, an initiator region 96, a moderator region, and a tapered outlet 100. The conditioner region 94 is coupled to a cooling element 106 and provides a cool-wet wall 104. The initiator region 96 is coupled to a heating element 108. The moderator region 98 is coupled to a cooling element 110. Aerosol from the extractor 12 is input at inlet 92 and material flows through the conditioner 94, activation region 96, moderator 98 and outlet 100 to an impaction spot 104. Water droplets are encapsulated, water is removed and droplet/particle is captured. The collector may utilize laminar flow or turbulent flow. The condensing fluid may be aqueous, organ or fluorocarbon based. A minimum activated particle diameter may is variable to limit or enhance condensation onto larger particles of precipitated non-volatile residue (NVR) and/or to vary the minimum collected particle size. The impaction spot is warmed to a predetermined temperature to evaporate water drops for dry collection. An on-line drying process ensures evaporation of the condensed water so that dry particles are present on the substrate. The 110 substrate in the spot sampler 14 is preferably repositionable allowing for time resolved particle collection. Deposition and collection are preferably spatially varied. This may occur periodically or at defined time steps into a single or multiple substrates.

Figure 11:
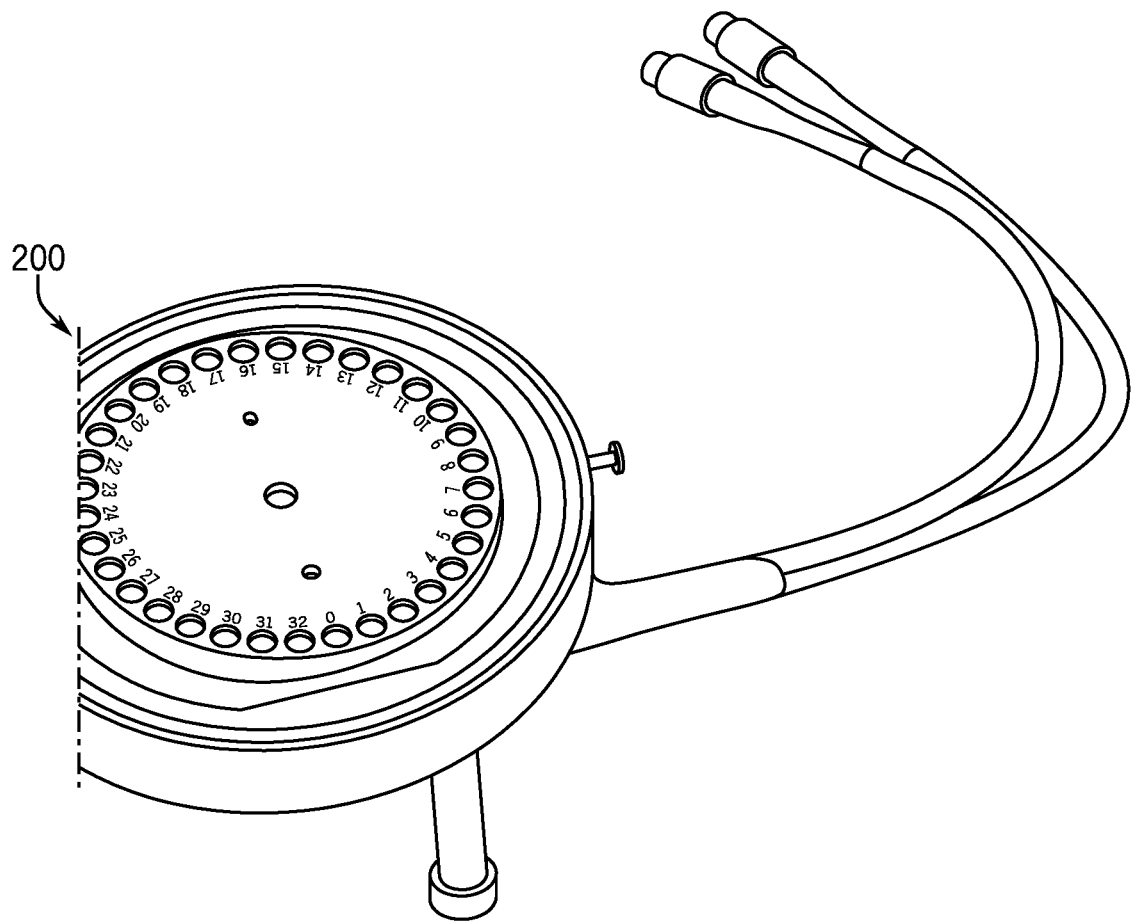
Figure 12:
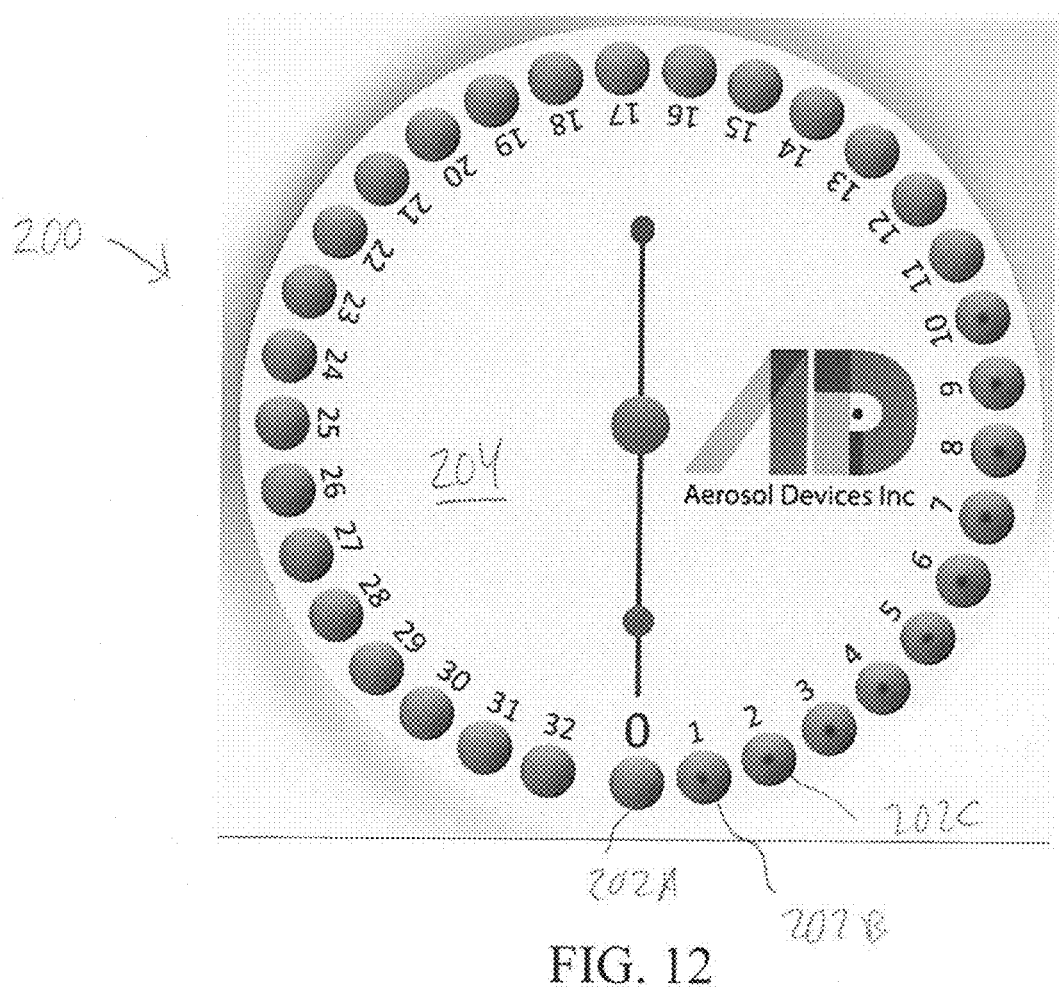

A preferred sample plate 200 is a thirty three (33) well 202 plate 204 made of PEEK shown in FIGS. 11 and 12. This sample plate is also available from Aerosol Devices, Inc. This arrangement enables affordable, time-resolved characterization of particulate chemical composition at multiple locations. It provides an uninterrupted collection of particulate mater (PM) as concentrated dry deposits into small sample wells. PM deposits can be analyzed directly using spectrographic methods, or extracted for wet chemistry analysis.

Beneficial features of the preferred spot sampler—collector 14 include:
  High collection efficiency from 5 to >25,000 nm.
  No particle bounce.
  Captures soluble and insoluble particles.
  Moderate temperatures (25-30 degrees C.) for condensational growth.
  No steam injection required.
  Sub saturated outlet flow at room temperatures.
  User-selected sampling intervals from 1 minute to 24 hours.
  Particles concentrated as a 1-mm "spot" in a sample well are ready for analysis.
  User-selected well temperature to evaporate water.
  Sample plate 200 may be cleaned and reused.
  Interface with a PAL3 autosampler for automated chemical analysis.

To quantify the concentration of particles within a liquid sample, a calibration method is needed to determine the overall volume inspection rate (VIR) where:

$$VIR = \text{aerosolization rate} \times \text{collection efficiency} \times \text{microscopy efficiency}$$

Returning to FIGS. 1-3, the NPN 12 provides a means to inject a colloid at a prescribed rate into the sample stream at a known volumetric flow rate. Injecting a standard of a known composition and concentration allows for identification and quantification of the aerosolized particles. In one example, colloidal silica at a known size and number concentration was injected at 100 ul/min into the sample stream flowing at 100 ml/min providing a dilution ratio of 1000. The aerosolization rate for this system was determined using methods described in Grant et. al. in U.S. Pat. No. 9,086,350 and Grant et al. in U.S. Pat. No. 9,513,198, both of which are hereby incorporated by reference. The impaction substrate in the spot sampler 14 provides a conductive surface as well as a distinct contrast compared to the particle material. For colloidal silica samples, a carbon tape mounted on a glass slip provides a rigid collection surface. In addition to quantifying the aerosolization rate, collection efficiency, and microscopy detection efficiency, the nanoparticle injection device and method of the present invention also allows for validation of the aerosolization, collection, and microscopy methods.

Online dilution facilitates collection of colloidal samples (e.g. chemical mechanical polishing slurries) for microscopy analysis (shape, concentration, dispersion, and composition of the colloid particles). The online dilution reduces dissolved non-volatile residue concentrations in the sample which, in addition to the small average droplet size, reduces interference by residue precipitate onto the particles as well as interference from discrete artifact particles composed of only precipitated residue. Quantification of colloid particle agglomeration is facilitated by varying the dilution ratio and observing the ratio of single to doublet particles (which is constant for native agglomeration and variable for agglomeration within the nebulized droplet).

In a preferred analysis of the samples, UPW borne particles are identified using a Hitachi SU8200 Series FE-SEM combined with HIGHTAIL EDX analysis.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A particle detector apparatus for identifying particles in liquids comprising,
   an extractor having a liquid sample inlet, and a nebulizer connected to the liquid sample inlet, the nebulizer having a gas supply, and an outlet;
   a tracer particle introducer connected to the nebulizer, the tracer particle inducer injecting tracer particles of a known size, composition, and concentration;
   a collector connected to the extractor, the collector having a collector inlet connected to the outlet of the extractor, a growth tube connected to the collector inlet, and at least one particle capture plate constructed and arranged to receive material output from the growth tube; and
   whereby, in use, tracer particles are injected at a prescribed rate into a liquid sample at a known volumetric flow rate to identify particles in the liquid sample.

2. The particle detector of claim 1, which in use, permits rapid detection and identification of sub–20 nanometer particles.

3. The particle detector of claim 2, for detection and identification of sub–20 nanometer particles in Ultra Pure Water.

4. The particle detector of claim 1, wherein the tracer particles are provided in a colloidal suspension of silica, of approximately 10 am in size.

5. The particle detector of claim 4, wherein the colloidal suspension of silica is injected at rate of 100 ul/ml, and the sample flow a rate of 100 ul/ml.

6. The particle detector of claim 1, wherein the tracer particles are introduced directly into the sample.

7. The particle detector of claim 1, wherein the tracer particles are introduced online into the sample stream.

8. The particle detector of claim 1, wherein the extractor limits the presence of droplets to a predetermined size, thereby avoiding droplets which are sufficiently large to cause interference with accurate detection.

9. The particle detector of claim 1, wherein the extractor further comprises an impactor constructed and arranged to receive material output from the nebulizer.

10. The particle detector of claim 9, wherein the extractor further comprises an evaporator communicatively connected to the nebulizer and impactor for providing an aerosol at the extractor outlet.

11. The particle detector of claim 10, wherein the extractor further comprises a quench flow gas to the extractor outlet.

12. The particle detector of claim 11, wherein the extractor further comprises a drip counter communicatively connected to the nebulizer and the impactor, for receiving waste material therefrom.

13. The particle detector of claim 1, wherein the growth tube is a condensation particle growth tube, and wherein the collector increases particle size via vapor condensation onto particles aerosolized by the extractor.

14. The particle detector of claim 13, wherein the collector utilize laminar flow.

15. The particle detector of claim 13, wherein the collector utilizes turbulent flow.

16. The particle detector of claim 13 wherein the collector utilizes a condensing fluid selected from the group of fluids consisting of an aqueous liquid, an organic liquid, and a fluorocarbon based liquid.

17. The particle detector of claim 1, wherein the collector capture plate is adapted to be analyzed by optical analysis or chemical analysis to identity detected particles.

18. The particle detector of claim 17, wherein the capture plate is repositionable to spatially vary deposition of impacted output for rapid identification of detected particles.

19. A particle detector for detecting and identifying sub 20 nm particles in liquids, comprising,
   a. a nano particle extractor having a liquid sample inlet, and a nebulizer connected to the liquid sample inlet, the nebulizer having a gas supply, and an outlet, the nano particle extractor limiting the size of droplets output to a predetermined size;
   b. a nano particle collector connected to the extractor, the collector having an collector inlet connected to the outlet of the extractor, a vapor condensation growth tube connected to the collector inlet, and at least one particle capture plate constructed and arranged to receive material output from the growth tube;
   c. a tracer particle introducer connected to the liquid sample inlet of the extractor, the tracer particle introducer injecting tracer particles of a known size, composition, and concentration;
   d. wherein the tracer particles are provided in a colloidal suspension of silica, of approximately 10 nm in size;
   e. wherein the colloidal suspension of silica is injected at rate of 100 ul/ml, and the sample flow a rate of 100 ul/min; and
   f. whereby, in use, tracer particles are injected at a prescribed rate into a liquid sample at a known volumetric flow rate to identify particles in the liquid sample.

20. A particle detector for rapidly detecting and identifying sub 20 nm particles in liquids, specifically Ultra Pure Water, comprising,
   a. a nano particle extractor for limiting the size of droplets output to a predetermined size, the extractor having:
     i. a liquid sample inlet,
     ii. a nebulizer connected to the liquid sample inlet, the nebulizer having a gas supply, and an outlet,
     iii. an impactor constructed and arranged to receive material output from the nebulizer,
     iv. an evaporator communicatively connected to the nebulizer and impactor for providing an aerosol at the extractor outlet, and
     v, an aerosol outlet communicatively connected to the evaporator;
   b. a nano particle collector connected to the extractor, the collector having:
     i. a collector inlet connected to die aerosol outlet of the extractor,
     ii. a vapor condensation growth tube connected to the collector inlet, and
     iii. a repositionable particle capture plate constructed and arranged to receive material output from the growth tube at spatially varying positions, wherein the collector capture plate is adapted to be analyzed by optical analysis or chemical analysis to rapidly identify detected particles; and
   c. a tracer particle introducer connected to the liquid sample inlet of the extractor, the tracer particle introducer including a tracer particle supply connected to a pump which is connected to the extractor, and wherein, in use:
     i. tracer particles are injected at a prescribed rate into a liquid sample at a known volumetric flow rate to identify particles in the liquid sample;
     ii. the tracer particles are provided in a colloidal suspension of silica, of approximately 10 nm in size;
     iii. the colloidal suspension of silica is injected at an initial dilution ratio at an injection rate of 100 ul/ml and a liquid sample flow a rate of 100 ul/min; and
     iv, the dilution ratio is varied, and particle agglomeration is quantified by observing a ratio of single to double particles.

* * * * *